(12) United States Patent
Liu et al.

(10) Patent No.: US 11,726,710 B2
(45) Date of Patent: Aug. 15, 2023

(54) MATRIX SUPER PARITY FOR DATA STORAGE

(71) Applicant: Seagate Technology LLC, Fremont, CA (US)

(72) Inventors: Xiong Liu, Singapore (SG); Wei Zhang, Singapore (SG); Jin Quan Shen, Singapore (SG); Feng Shen, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/130,863

(22) Filed: Dec. 22, 2020

(65) Prior Publication Data

US 2022/0197554 A1   Jun. 23, 2022

(51) Int. Cl.
*G06F 3/06* (2006.01)
*G06F 11/10* (2006.01)
*G11B 20/12* (2006.01)

(52) U.S. Cl.
CPC .......... *G06F 3/0659* (2013.01); *G06F 3/0619* (2013.01); *G06F 3/0676* (2013.01); *G06F 11/1004* (2013.01); *G11B 20/1258* (2013.01); *G11B 2020/1292* (2013.01)

(58) Field of Classification Search
CPC .. G06F 3/0619; G06F 11/1004; G06F 3/0659; G06F 3/0676; G11B 20/1258
See application file for complete search history.

(56) References Cited

U.S. PATENT DOCUMENTS

| | | | |
|---|---|---|---|
| 10,379,952 B2 | 8/2019 | Mateescu et al. | |
| 10,802,908 B2 | 10/2020 | Ofir et al. | |
| 2016/0350185 A1 | 12/2016 | Hong et al. | |
| 2017/0200468 A1* | 7/2017 | Zhu | G11B 20/1217 |
| 2017/0345456 A1* | 11/2017 | Hassner | G06F 11/1048 |
| 2018/0167088 A1* | 6/2018 | Vakilinia | G06F 11/108 |
| 2020/0264951 A1* | 8/2020 | Yamagishi | G06F 11/1068 |

* cited by examiner

*Primary Examiner* — Baboucarr Faal
(74) *Attorney, Agent, or Firm* — Holzer Patel Drennan (57) ABSTRACT

The technology disclosed herein pertains to a system and method for storing data on a storage media using both down-track super parity and cross-track super parity. Specifically, a method disclosed herein provides for generating down-track super parity values for data on the plurality of tracks and storing the down-track super parity values on a down-track super parity row of the storage block and generating cross-track super parity values for data on the plurality of rows and storing the cross-track super parity values on a cross-track upper parity track, wherein the cross-track super parity value for any given row is generated by inputting the data on the given row into an exclusive-OR (XOR) gate.

20 Claims, 6 Drawing Sheets

MATRIX SUPER PARITY FOR DATA STORAGE

BACKGROUND

A hard-disk drive ("HDD") device may contain a number of magnetic storage disks that include a number of concentric data tracks containing the data stored on the device. As the storage capacity of HDD devices increases, the areal density capability ("ADC") of the storage disks may also increase. The ADC of a storage disk has two main components: the number of bits of data that can be squeezed on the disks in along-track direction, measured in bits-per-inch ("BPI"), and the number of data tracks squeezed into a cross-track direction, measured in tracks-per-inch ("TPI"). The ADC of a storage device may be expressed as the multiplication of BPI and TPI. Perpendicular magnetic recording ("PMR") technology used widely in HDD devices is approaching its superparamagnetic limit at existing storage densities, which restricts device manufactures from increasing ADC of the storage disks. In addition, alternative recording technologies to the existing PMR technology favor higher TPI more than PMR technology. For example, shingled magnetic recording ("SMR") by design writes narrower tracks. The super-parity (SP) plays an important role to maintain the data integrity of SMR drive with ADC push. Generally, the higher the SP correcting capability, the more ADC push.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for storing data on a storage media using both down-track super parity and cross-track super parity. Specifically, a method disclosed herein provides for generating down-track super parity values for data on the plurality of tracks and storing the down-track super parity values on a down-track super parity row of the storage block and generating cross-track super parity values for data on the plurality of rows and storing the cross-track super parity values on a cross-track upper parity track, wherein the cross-track super parity value for any given row is generated by inputting the data on the given row into an exclusive-OR (XOR) gate.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 3 illustrates example super blocks with correctable events that may be corrected by using the MSP scheme disclosed herein.

DETAILED DESCRIPTION

The superparity (SP) plans play important role in maintaining the data integrity of shingled media recording (SMR) drive with areal density capability (ADC) push. Generally, the higher SP correcting capability, the more ADC push. Implementations disclosed herein provides a method for calculating cross-track super parity. In one example implementation, the cross-track super parity is calculated using XOR (specifically, Bitwise XOR) gate system of chip (SoC). Providing cross-track super parity allows recovering data with significantly higher amount of bad sectors present on the storage device. Specifically, the matrix super parity (MSP) for SMR disclosed herein is able to correct bad sectors on a storage device in both down-track and cross-track for a given SMR band. Herein the track can be physical track or virtual track. For example, for an implementation with 200 data sectors as a virtual track, the SP matrix can be 200×200, 200×250, etc.

Figure 1:
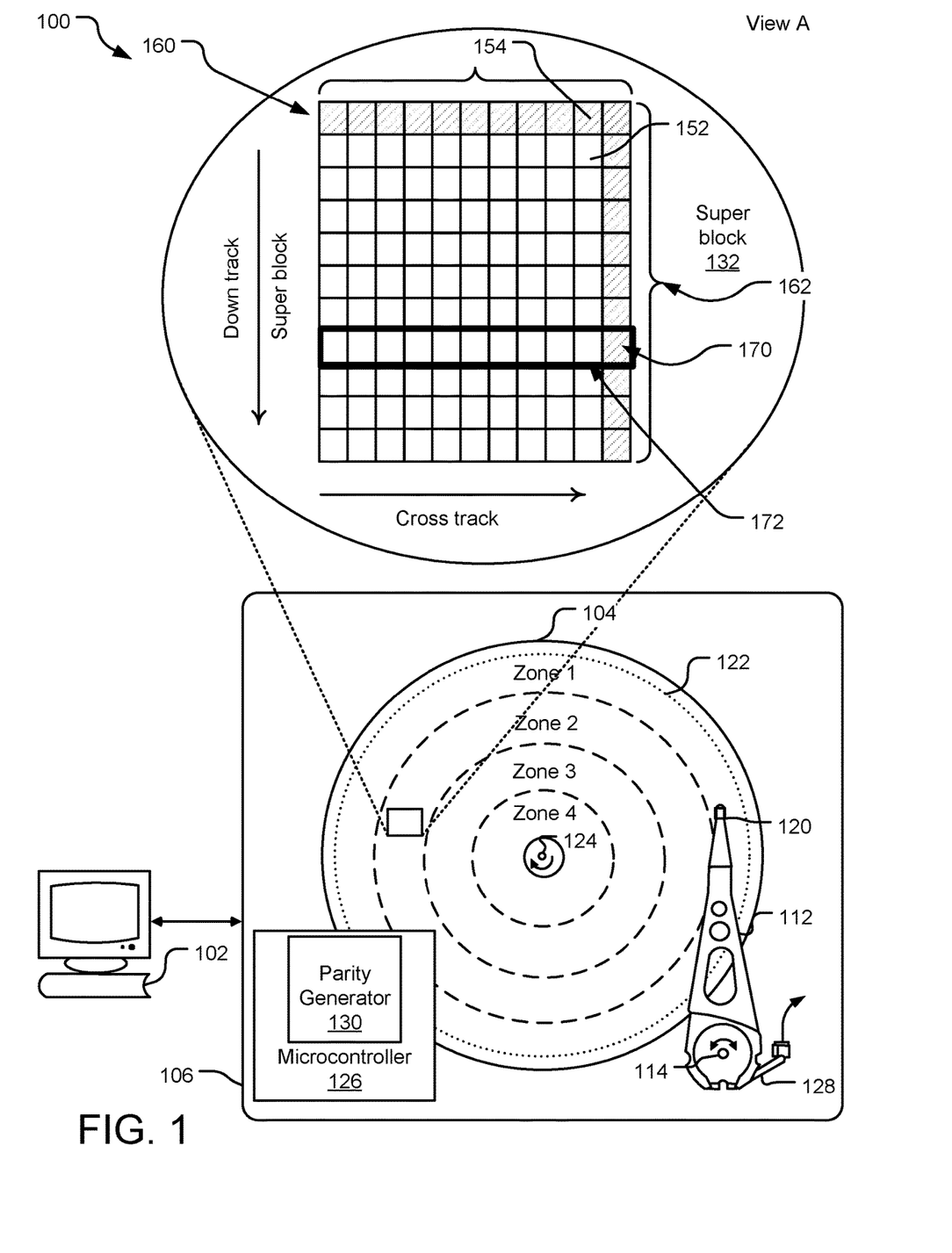
FIG. 1 illustrates a schematic diagram of an example data storage system utilizing the matrix super parity (MSP) scheme disclosed herein.

FIG. 1 illustrates a schematic diagram of a data storage system 100 utilizing the matrix super parity (MSP) scheme disclosed herein. The data storage system includes a host computer 102 that sends one or more access commands (e.g., read or write commands) to a storage device 106. The storage device 106 is a disk drive assembly. However, in other implementations, the storage device 106 may be any device having any tangible computer-readable storage media. Such tangible computer-readable media may include without limitation magnetic storage disks, solid state drives, flash memory, optical storage disks, random access memories (RAMs), read only memories (ROMs) and the like. The storage device 106 includes a disk 104 that may store data on one or both of its planar surfaces (only one planar surface is shown). Further, each planar surface capable of storing data includes a series of thin concentric tracks (e.g., a data track 122).

A head assembly (e.g., a head 120) is positioned adjacent to each planar surface capable of storing and retrieving data. Each head assembly reads and writes data to and from the corresponding planar surface. The head 120 is attached to a distal end of an actuator arm 112 positioned over the disk 104. A rotary voice coil motor that rotates about an actuator axis of rotation 114 is used to position the head 120 on a data track (e.g., the data track 122) and a spindle motor that rotates about disk axis of rotation 124 is used to rotate the disk 104. A flex cable 128 provides the requisite electrical connection paths for the head 120 while allowing pivotal movement of the actuator arm 112 during operation. Servo signals are detected and demodulated by one or more demodulator circuits (not shown) and processed by a digital signal processor (not shown) to control the position of the head 120. It should be understood that the described technology may be used with a variety of storage formats, including continuous magnetic media, discrete track media, shingled media, etc.

The storage device 106 includes a microcontroller 126 that includes a parity generator 130 that generates super parity in cross-track and down-track directions for one or more superblocks of data. In one implementation, a superblock of data for the storage device 106 may include 400 sectors with each sector having 4K of data. However, in alternative implementations, the size of the sectors and the superblocks may be different. FIG. 1 illustrates such a superblock 132 having a plurality of sectors including sectors 152, 154, etc. In the illustrated implementation, the superblock 132 is illustrated with one-hundred (100) data sectors, a parity sector row for storing down-track parities, and a parity sector column for storing cross-track parities. Specifically, the block 152 is a data sector—illustrated without shading. On the other hand, block 154 is a parity sector. FIG. 1 illustrates a row 160 of parity blocks at the top of the superblock 132 as well as a column 162 of parity blocks along the right edge of the superblock 132.

Each block of the parity row 160 stores parity calculated based on data stored in the other blocks in that column. Similarly, each block of the parity column 162 stores parity calculated based on data stored in the other blocks in that row. Thus, the implementation disclosed in FIG. 1 the super parity is matrix super-parity (MSP) in that super parity is calculated along both cross-track and down-track directions. In one implementation, each sector of the cross-track super parity, as shown in column 162, is generated by inputting the data of each sector of a given row into an exclusive-OR (XOR) gate. Thus, for example, the super parity sector 170 is generated by inputting the data of each sector of a row 172 into an exclusive-OR (XOR) gate. Specifically, the cross-track super parity sectors are generated by inputting row data, before encoding the data received from the computer 102, into the XOR gate.

The microcontroller 126 may also include a plurality of encoders configured to encode data from the host computer 102 before the data is written to the disk 104 after the super parity is generated. The encoders may be hardware, software, and/or firmware executable by an integrated processor of the storage device 106 or a processor of a host computer 102. To write data to the disk 104, the host computer 102 sends data in a form of a binary data stream (i.e., a series of 1's and 0's) to the storage device 106. The microcontroller 126 receives the binary data stream and generates super parity bits for various data sectors before/after encoding the data stream to store in the data sectors, such as the data sector 154. Specifically, for down-track super sectors, parity sector bits are generated after data hardware encoding, whereas for cross-track super sectors, parity sector bits can be generated before or after data encoding. Thus, the cross-track super parity sectors are generated without encoding, so that the controller can write SP track as writing a normal data track.

Storing the data to the data sectors after generating the MSP in the manner disclosed in FIG. 1, allows the microcontroller to correct bad sectors in both cross-track and down-track directions for shingled media recording (SMR) bands. Specifically, the tracks here can be both physical tracks or a virtual tracks. For example, 200 data sectors can be stored as a virtual track and in that case, the matrix can be 200×200. If 250 data sectors are stored as a virtual track, the matrix can be 250×250. Alternatively, the matrix may also have number of rows different than the number of columns such as 200×220, 250×200, etc.

Figure 2:
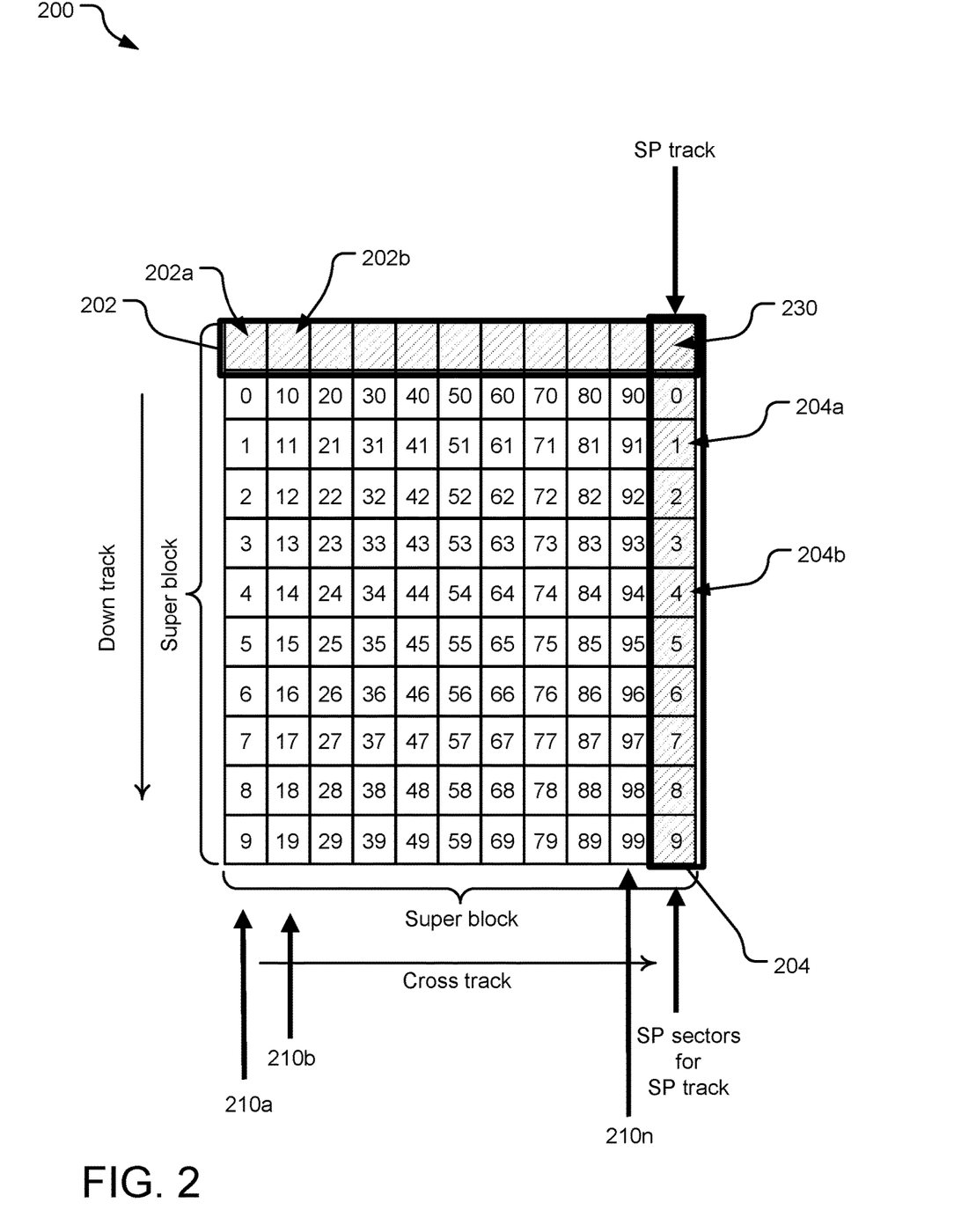
FIG. 2 illustrates an example super-block employing the MSP scheme disclosed herein.

FIG. 2 illustrates an example super-block 200 employing the MSP scheme disclosed herein. Specifically, the superblock 200 stores data in data sectors 0-99. The down-track super parity row 202 stores super parity for down-track sectors. Thus, for sectors 0-9, super parity is stored at 202a, for sectors 10-19, the super-parity is stored at 202b, etc.

Each block of a cross-track super parity column 204 stores cross-track super parity for its respective column. Thus, for example, the super-parity block 204a stores a super parity for data blocks 1, 11, 21, . . . 91. Similarly, the super-parity block 204b stores a super parity for data blocks 4, 14, 24, . . . 94. The cross-track super parity blocks are generated by inputting raw data for each sectors in the cross-track direction into an XOR gate. For example, the raw data for each of the sectors 1, 11, 21, . . . 91 is input into an XOR gate to generate cross-track parity value 204a. Similarly, the raw data for each of the sectors 4, 14, 24, . . . 94 is input into another XOR gate to generate cross-track parity value 204b, etc. In one implementation, the XOR gates to generate the cross-track super parity values are bitwise XOR gates implemented on a system on chip (SoC). Once the super parity values are calculated, they are stored to the super parity track in a manner similar to writing the raw data to data tracks.

In one implementation, the outputs of the XOR for one track are stored in a buffer until other tracks are written. Thus, for example, the XOR results of a first cross-track having sectors 0, 10, 20, . . . 90 are kept in buffer while writing data to those sectors. For example, after writing sectors 0-9 of the first data track 210a and super parity 202a, the values of the sectors 0-9 are stored in a cross-track SP buffer. The cross-track SP buffer may have a size of number of sectors per track, e.g. size is 10, given 10 sectors per track in this implementation. After writing sectors 10-19 of the second data track 210b and the super parity 202b, the raw data of the first data track 210a as stored in the cross-track SP buffer are XOR'd with the raw data of the second data track 210b and the output of the XOR operations are stored in the cross-track SP buffer. The above steps are repeated as other tracks up to 210n are written. Finally, the output of the cross-track SP buffer is written to the sectors of the SP track in the same manner as writing data to the data tracks 210a-210n.

FIG. 3 illustrates example super blocks with correctable events that may be corrected by using the MSP scheme disclosed herein. For example, the errors in sectors 1, 22, and 75, as shown in superblock A 302 can be corrected using either the down-track super-parities or the cross-track super parities. For superblock B 304, the errors in blocks 1, 4, 7, 22, and 75 may be corrected using the cross-track super parities. For super-block C 306, errors in sectors 22, 34, 57, and 75 may be corrected by down-track super parities and then errors in blocks 1, 4, and 7 may be corrected by cross-track super parities. Here the errors in sectors 22 and 75 may also be corrected by cross-track super parities. In superblock D 308, the errors in sectors 22, 48, 57, 64, 75 and 94 are first corrected by using down-track super parities. Then, errors in sectors 1, 7, 33, 82, and 88 are corrected by the cross-track super parities and subsequently errors in blocks 4 and 34 are corrected by using the down-track super parities again as sectors 1, 7, and 33 are corrected already.

For superblock E 310, errors in sectors 18, 22, 33, 48, 57, 64, 75, 82, and 94 are first corrected by down-track super parities. Then the errors in the entire first track with sectors 0-9 may be corrected by the cross-track super parities.

Figure 4:
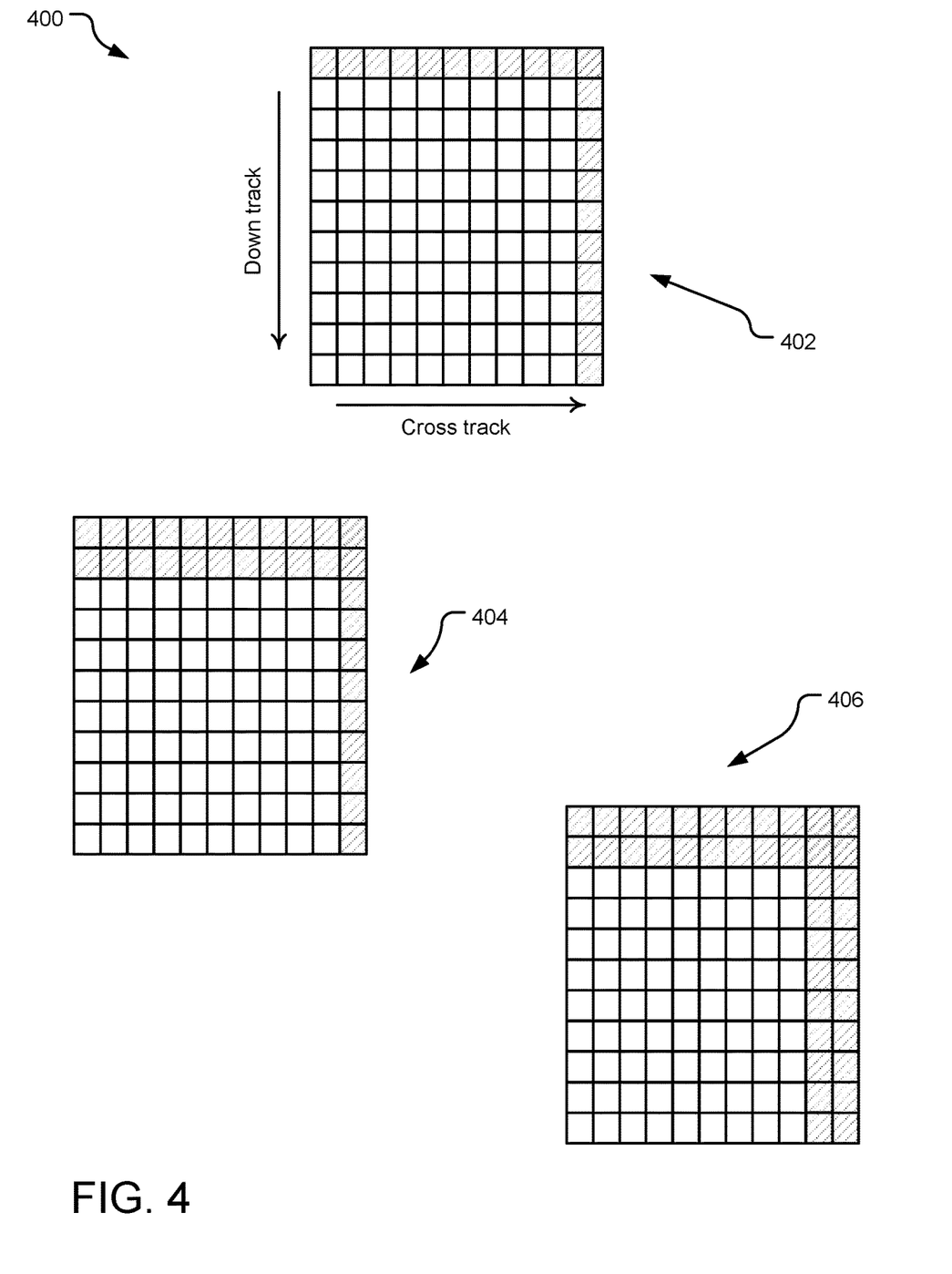
FIG. 4 illustrates example super-blocks deploying alternative MSP schemes as disclosed herein

FIG. 4 illustrates example super-blocks deploying alternative MSP schemes as disclosed herein. For example, superblock 402 has one row of down-track parity and one column of cross-track parity making up the MSP. This configuration does not result in any ADC loss, but it provides ADC gain due to higher correcting ability of the MSP.

On the other hand, superblock 404 has two rows of down-track parity and one column of cross-track parity. This configuration results in 0.5% ADC loss if there are 200 virtual tracks per band. However, this configuration can squeeze more tracks/band given its higher correction capability, which would result in ADC gain.

Alternatively, superblock 406 has two rows of down-track parity and two columns of cross-track parity. This configuration results in 1% ADC loss if there are 200 virtual tracks per band. However, this configuration can squeeze much higher tracks/band given its much higher correction capability, which would again result in ADC gain.

Figure 5:
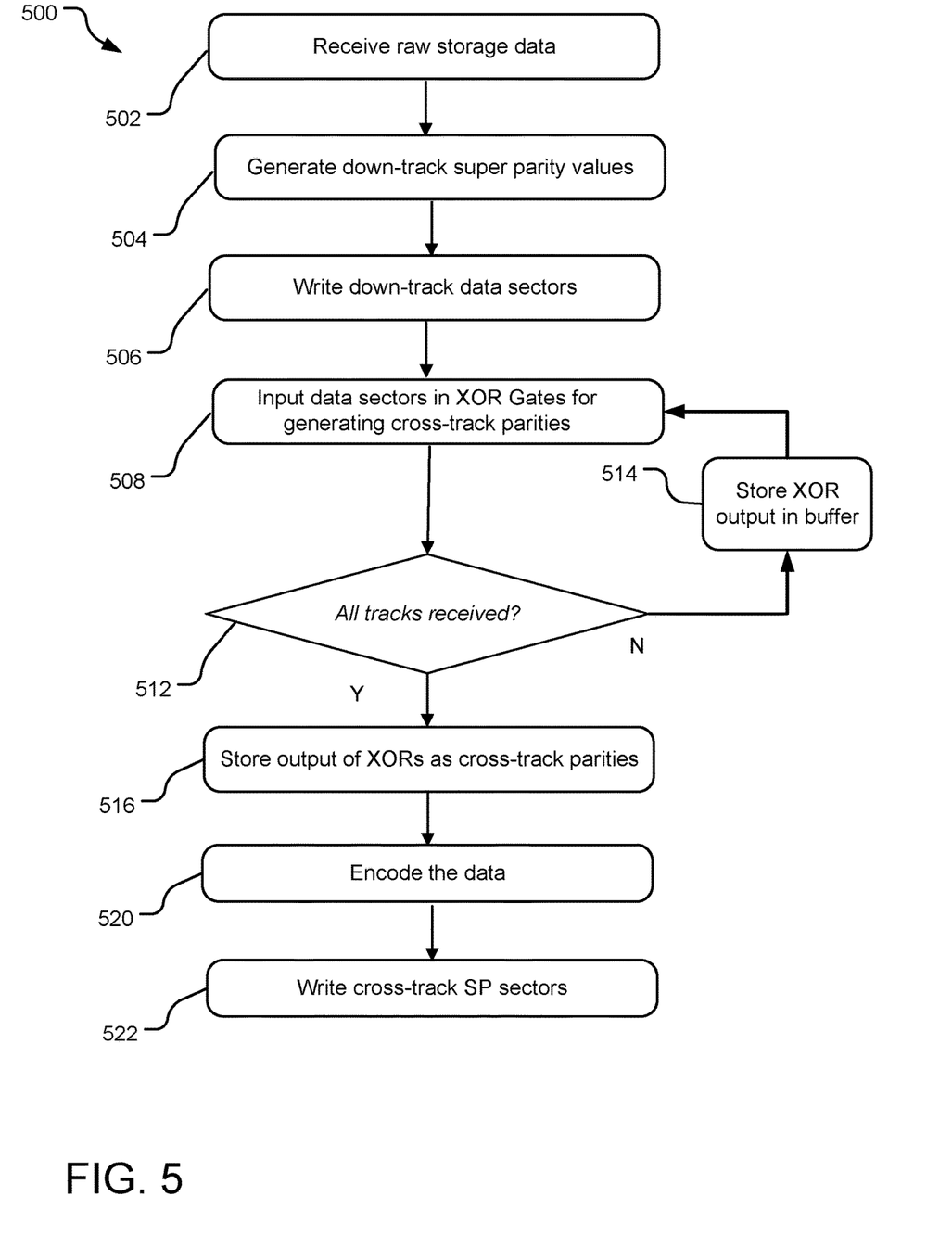
FIG. 5 illustrates example operations for deploying the MSP scheme disclosed herein to store data on a storage device.

FIG. 5 illustrates operations 500 for deploying the MSP scheme disclosed herein to store data on a storage device. An operation 502 receives raw data from a host at the storage device. For example, the raw data may come in by track. Thus, data for first track arrives before raw data for second track, etc. An operation 504 generates down-track parity values and the data is written to the track at operation 506. In an alternative implementation, the operations 504 and 506 may be combined as the SP is generated during the writing operation. An operation 508 inputs the data for each cross-track in an XOR gate. In general, if there are 10 cross-track, nine XOR operation are needed to generate SP track, e.g. 204=210*a* XOR 210*b*, 204=204 XOR 210*c*, . . . , 204=204 XOR 210*n*. Furthermore, the SP sector 230 (top-right) of SP track may be generated when writing SP track and written to disc, which is similar to writing any data track.

An operation 512 determines if data for all tracks for a super block are received. If not, at operation 514 the output of each XOR gate is stored in its respective buffer so that it can accumulate the XOR values across all tracks. If data for all tracks is received, at operation 516 the outputs of the XOR gates are stored as cross-track parities. Subsequently an operation 520 encodes the raw data of cross-track SP sectors and writes them to media. An operation 522 writes cross-track SP sectors.

Figure 6:
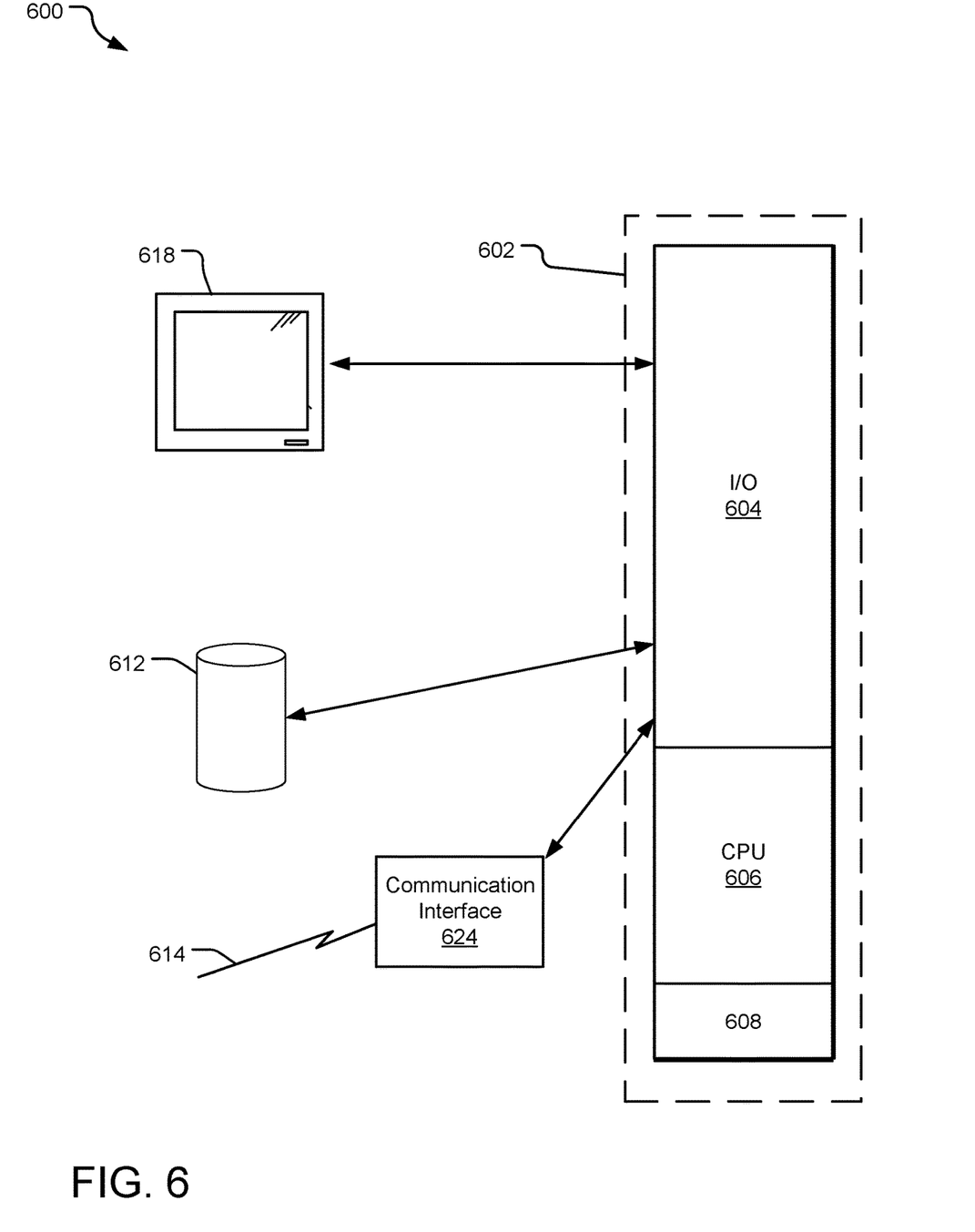
FIG. 6 illustrates an example processing system that may be useful in implementing the described technology.

FIG. 6 illustrates an example processing system 600 that may be useful in implementing the described technology. The processing system 600 is capable of executing a computer program product embodied in a tangible computer-readable storage medium to execute a computer process. Data and program files may be input to the processing system 600, which reads the files and executes the programs therein using one or more processors (CPUs or GPUs). Some of the elements of a processing system 600 are shown in FIG. 6 wherein a processor 602 is shown having an input/output (I/O) section 604, a Central Processing Unit (CPU) 606, and a memory section 608. There may be one or more processors 602, such that the processor 602 of the processing system 600 comprises a single central-processing unit 606, or a plurality of processing units. The processors may be single core or multi-core processors. The processing system 600 may be a conventional computer, a distributed computer, or any other type of computer. The described technology is optionally implemented in software loaded in memory 608, a storage unit 612, and/or communicated via a wired or wireless network link 614 on a carrier signal (e.g., Ethernet, 3G wireless, 8G wireless, LTE (Long Term Evolution)) thereby transforming the processing system 600 in FIG. 6 to a special purpose machine for implementing the described operations. The processing system 600 may be an application specific processing system configured for supporting a distributed ledger. In other words, the processing system 600 may be a ledger node.

The I/O section 604 may be connected to one or more user-interface devices (e.g., a keyboard, a touch-screen display unit 618, etc.) or a storage unit 612. Computer program products containing mechanisms to effectuate the systems and methods in accordance with the described technology may reside in the memory section 608 or on the storage unit 612 of such a system 600.

A communication interface 624 is capable of connecting the processing system 600 to an enterprise network via the network link 614, through which the computer system can receive instructions and data embodied in a carrier wave. When used in a local area networking (LAN) environment, the processing system 600 is connected (by wired connection or wirelessly) to a local network through the communication interface 624, which is one type of communications device. When used in a wide-area-networking (WAN) environment, the processing system 600 typically includes a modem, a network adapter, or any other type of communications device for establishing communications over the wide area network. In a networked environment, program modules depicted relative to the processing system 600 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 608 and/or the storage unit 612 and executed by the processor 602. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 608 and/or the storage unit 612 and executed by the processor 602.

The processing system 600 may be implemented in a device, such as a user device, storage device, IoT device, a desktop, laptop, computing device. The processing system 600 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, which exclude signals per se, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   receiving data for storage on a storage block of a storage device, the storage block comprising a plurality of rows of storage sectors over a predetermined number of columns of storage sectors on a plurality of tracks of storage media;
   generating down-track super parity values for data on the plurality of tracks and storing the down-track super parity values on a down-track super parity row in the storage block;
   generating cross-track super parity values for data on the plurality of rows and storing the cross-track super parity values on a cross-track upper parity track in the storage block,
   wherein the cross-track super parity value for any given row is generated by inputting the data on the given row into an exclusive-OR (XOR) gate.

2. The method of claim 1, wherein cross-track super parity value for any given row is generated by inputting the data on the given row into an exclusive-OR (XOR) gate without coding the data on the given row.

3. The method of claim 2, wherein the XOR gate is configured on a bitwise XOR (BXOR) system on chip (SoC).

4. The method of claim 2, further comprising storing output of the XOR gate for each row in buffers after writing each track.

5. The method of claim 1, further comprising determining down-track super parity for the cross-track upper parity track.

6. The method of claim 1, wherein the storage device stores data on the storage media using shingled media recording (SMR).

7. The method of claim 1, wherein there are two cross-track upper parity tracks.

8. A storage device, comprising:
   a data writer to write data to a storage block of the storage device, the storage block comprising a plurality of rows of storage sectors over a predetermined number of columns of storage sectors on a plurality of tracks of storage media; and
   a storage controller configured to:
      generate down-track super parity values for data on the plurality of tracks and storing the down-track super parity values on a down-track super parity row in the storage block, and
      generate cross-track super parity values for data on the plurality of rows and storing the cross-track super parity values on a cross-track upper parity track in the storage block, wherein the cross-track super parity value for any given row is generated by inputting the data on the given row into an exclusive-OR (XOR) gate.

9. The storage device of claim 8, wherein cross-track super parity value for any given row is generated by inputting the data on the given row into an exclusive-OR (XOR) gate without coding the data on the given row.

10. The storage device of claim 9, wherein the XOR gate is configured on a bitwise XOR (BXOR) system on chip (SoC).

11. The storage device of claim 9, wherein the storage controller is further configured to store output of the XOR gate for each row in buffers after writing each track.

12. The storage device of claim 10, wherein the storage controller is further configured to determine down-track super parity for the cross-track upper parity track.

13. The storage device of claim 8, wherein the storage device stores data on the storage media using shingled media recording (SMR).

14. The storage device of claim 8, wherein there are two cross-track upper parity tracks.

15. One or more tangible computer-readable storage media encoding processor-executable instructions for executing on a computer system a computer process, the computer process comprising:
   receiving data for storage on a storage block of a storage device, the storage block comprising a plurality of rows of storage sectors over a predetermined number of columns of storage sectors on a plurality of tracks of storage media;

generating down-track super parity values for data on the plurality of tracks and storing the down-track super parity values on a down-track super parity row in the storage block;

generating cross-track super parity values for data on the plurality of rows and storing the cross-track super parity values on a cross-track upper parity track in the storage block, wherein the cross-track super parity value for any given row is generated by inputting the data on the given row into an exclusive-OR (XOR) gate.

16. The one or more tangible computer-readable storage media of claim 15, wherein cross-track super parity value for any given row is generated by inputting the data on the given row into an exclusive-OR (XOR) gate without coding the data on the given row.

17. The one or more tangible computer-readable storage media of claim 16, wherein the XOR gate is configured on a bitwise XOR (BXOR) system on chip (SoC).

18. The one or more tangible computer-readable storage media of claim 16, wherein the computer process further comprising storing output of the XOR gate for each row in buffers after writing each track.

19. The one or more tangible computer-readable storage media of claim 15, wherein the computer process further comprising determining down-track super parity for the cross-track upper parity track.

20. The one or more tangible computer-readable storage media of claim 15, wherein there are two cross-track upper parity tracks.

* * * * *